(12) United States Patent
Morin et al.

(10) Patent No.: US 7,540,354 B2
(45) Date of Patent: Jun. 2, 2009

(54) MICRO-PERFORATED ACOUSTIC LINER

(75) Inventors: Bruce L. Morin, Springfield, MA (US); Rudolph A. Ksiazkiewicz, Jr., Plainville, CT (US); Dennis Cicon, Conventry, CT (US)

(73) Assignee: United Technologies Corporation, Hartford, CT (US)

( * ) Notice: Subject to any disclaimer, the term of this patent is extended or adjusted under 35 U.S.C. 154(b) by 455 days.

(21) Appl. No.: 11/441,912

(22) Filed: May 26, 2006

(65) Prior Publication Data

US 2007/0272483 A1 Nov. 29, 2007

(51) Int. Cl.
*E04B 1/82* (2006.01)
(52) U.S. Cl. .................. 181/292; 181/286; 181/296; 428/116
(58) Field of Classification Search ........... 181/292, 181/286, 296; 428/116
See application file for complete search history.

(56) References Cited

U.S. PATENT DOCUMENTS

| 4,850,093 | A | * | 7/1989 | Parente | 29/428 |
| 5,041,323 | A | * | 8/1991 | Rose et al. | 428/116 |
| 5,912,442 | A | * | 6/1999 | Nye et al. | 181/292 |
| 6,358,590 | B1 | * | 3/2002 | Blair et al. | 428/73 |
| 6,609,592 | B2 | * | 8/2003 | Wilson | 181/292 |
| 6,827,180 | B2 | * | 12/2004 | Wilson | 181/292 |

* cited by examiner

*Primary Examiner*—Jeffrey Donels
*Assistant Examiner*—Christina Russell
(74) *Attorney, Agent, or Firm*—Carlson, Gaskey & Olds

(57) ABSTRACT

An example liner assembly includes a backing plate that supports a cellular structure covered by a perforated face sheet including a plurality of openings. Each of the plurality of openings is of a size determined to provide desired acoustic performance.

17 Claims, 2 Drawing Sheets

MICRO-PERFORATED ACOUSTIC LINER

BACKGROUND OF THE INVENTION

This invention generally relates to a liner assembly for reducing emitted noise propagating through a duct. More particularly, this invention relates to a method of fabricating an acoustic liner with improved acoustic and operational performance.

During operation, an aircraft propulsion system generates noise that requires attenuation and control. The noise generated by operation of the aircraft propulsion system is of many different frequencies, some of which contribute disproportionately more noise to the overall emitted noise. Accordingly, the aircraft propulsion system is provided with a noise attenuation liner. Ideally, the noise attenuation liner will reduce or eliminate noise of all frequencies generated within the propulsion system. However, practical limitations reduce the efficient attenuation of noise at some frequencies in favor of other noise frequencies.

For these reasons, noise attenuation liners are tuned or tailored to attenuate the most undesirable frequencies with the greatest efficiency. Unfortunately, the compromises required to efficiently attenuate the most undesirable frequencies limits the effective attenuation of other noise frequencies.

Conventional acoustic liners include a cellular structure sandwiched between a back sheet and a face sheet including a plurality of openings. The openings create aerodynamic drag on the propulsion system during operation. The drag inhibits overall propulsion system performance. A known improvement is the use of woven mesh to cover the face sheet. The woven mesh provides a desirably low skin friction coefficient that reduces drag. Further, the woven mesh provides effective noise attenuation over a broad range of noise frequencies. Disadvantageously, a woven-mesh liner does not provide the desired durability and therefore requires increased maintenance at a prohibitive cost.

Accordingly, it is desirable to design and develop a noise attenuation liner and method of fabricating a noise attenuation liner that provides the durability desired, with reduced drag and increased frequency attenuation ranges.

SUMMARY OF THE INVENTION

An example liner assembly includes a backing plate that supports a cellular structure covered by a perforated face sheet including a plurality of openings. Each of the plurality of openings is of a size determined to provide desired acoustic and aerodynamic performance.

The example liner assembly includes a plurality of cells covered by the perforated face sheet. The perforated face sheet includes a plurality of openings to communicate acoustic energy to the underlying cellular structure. The configuration of the perforated face sheet is fabricated to minimize drag while maximizing acoustic attenuation performance.

The example liner assembly is fabricated according to a relationship utilizing selected performance characteristics to determine physical dimensions of the perforated face sheet. The method of fabricating the example liner assembly includes the step of specifying a desired resistance and non-linearity factor. The resistance to airflow is a performance characteristic that is selected to optimize the liner acoustic performance. The non-linearity factor is used to further optimize the liner by accounting for changes in optimum resistance with engine operating speed.

A disclosed example method of fabricating a liner assembly begins by first selecting a desired resistance and non-linearity factor. The resistance value is a scalar quantity representing the amount of resistance provided by the liner at a fixed air flow. The resistance is tailored to the application operating conditions to provide for the attenuation of noise within a desired noise frequency band. The non-linearity factor is selected to provide the desired acoustic performance over a range of engine operating conditions.

Once the desired acoustic performance parameters have been selected, the percent open area is determined. Once the percent open area is determined, the diameter for the plurality of openings is determined as it relates to the thickness of the desired face sheet material.

Accordingly, an example acoustic liner assembly fabricated with a face sheet designed and built according to the method of this invention provides improved acoustic performance, reduced drag and improved linearity across a wide range of engine operating conditions in a durable acoustic liner assembly.

These and other features of the present invention can be best understood from the following specification and drawings, the following of which is a brief description.

DETAILED DESCRIPTION OF THE PREFERRED EMBODIMENT

Figure 1:
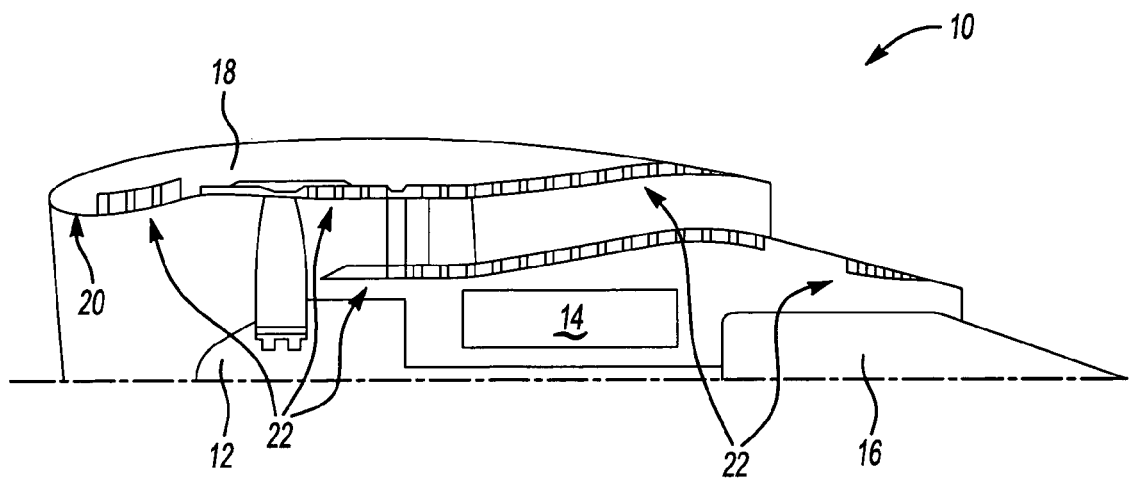
FIG. 1 is a schematic view of an example aircraft propulsion system.

Referring to FIG. 1, an example aircraft propulsion system 10 includes and engine assembly and nacelle. The engine assembly includes a compressor module 12 compressing incoming air and routing some of that air to a combustor module 14. In the combustor module 14 the compressed air is mixed with fuel and ignited to produce a high velocity air flow directed through a turbine module 16. Operation of the aircraft propulsion system 10 produces noises of various frequencies at such levels that some attenuation is required. An inner surface 20 directs airflow into and around the compressor module 12. The inner surface 20 of the nacelle 18 and engine assembly includes noise attenuation liners 22 disposed in desired locations for reducing the harshest of the noise generated by the engine assembly. The example liner assembly 22 is described as utilized with an aircraft propulsion system; however other applications will also benefit from the disclosure of the example liner assembly 22.

Figure 2:
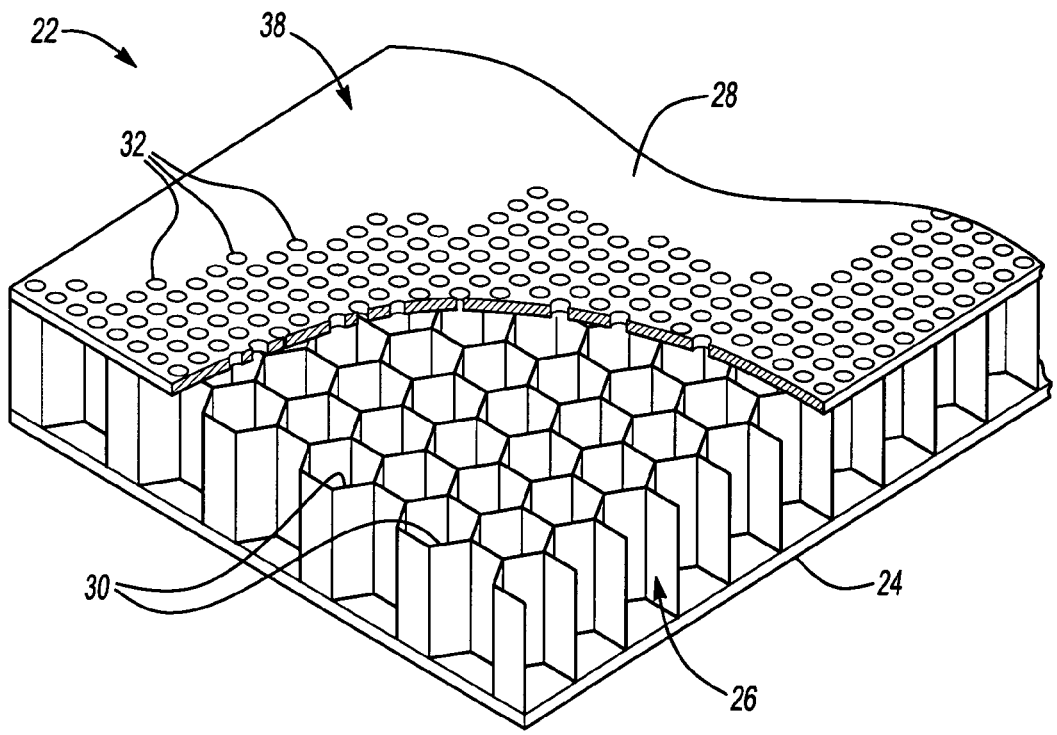
FIG. 2 is a cut away view of an example attenuation liner assembly.

Referring to FIG. 2, the liner assembly 22 includes a backing plate 24 that supports a cellular structure 26. The example cellular structure includes a plurality of cells 30 covered by a perforated face sheet 28. The face sheet 28 includes a plurality of openings 32 to communicate acoustic energy to the underlying cellular structure 26. The example face sheet 28 can be constructed of metal, plastic, composites and/or other known materials. A surface 38 of the face sheet 28 comprises a part of the inner surface 20 of the nacelle 18 or engine assembly. The inner surface 20 of the nacelle 18 or engine assembly is constructed to minimize drag.

The configuration of the face sheet 28 is fabricated to minimize drag while maximizing acoustic attenuation performance. The example openings 32 are generally round holes including a diameter. The number and diameter of openings 32 are determined to provide a desired percent open area. The percent open area is that area of all the plurality of openings 32 relative to the entire area of the surface 38. The percent open area as utilized and referred to in this application refers to an effective open area. The effective open area accounts for the partial blocking of holes caused by underlying structures or adhesives. The percent open area is determined to provide a desired performance of the noise attenuation liner assembly 22.

Figure 3:
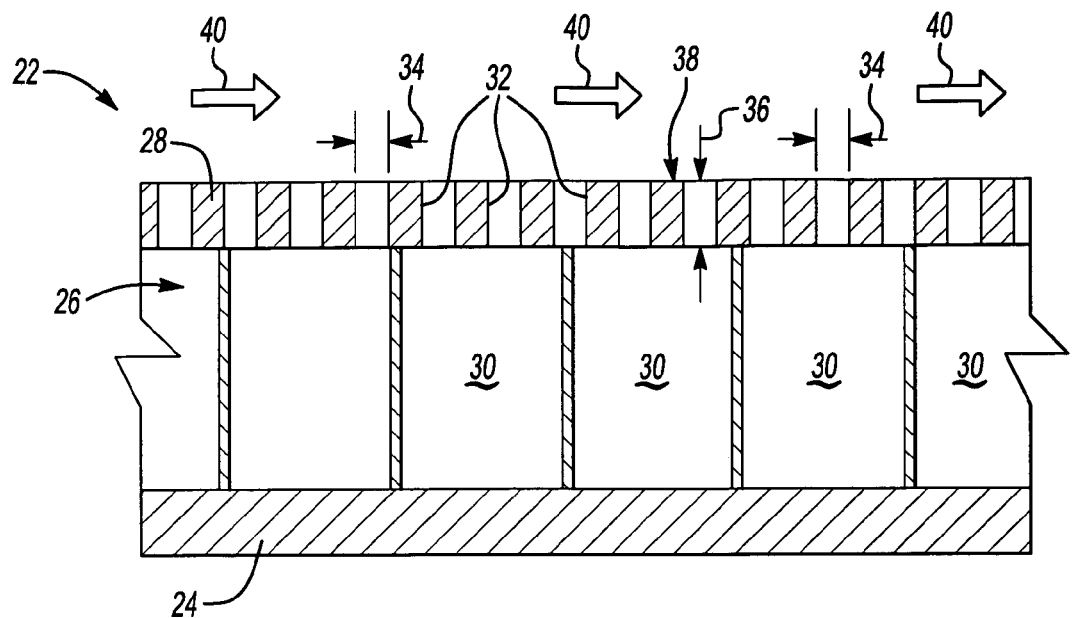
FIG. 3 is a cross-sectional view of an example attenuation liner assembly.

Referring to FIG. 3, a cross-section of the liner assembly 22 illustrates the openings 32 that communicate acoustic energy into the various cells 30 that comprise the cellular structure 26. A diameter 34 of the openings 32, along with the number of openings is determined to provide a desired percent open area. The percent open area along with the number and diameter of the plurality of openings are utilized to tailor the noise attenuation and aerodynamic performance of the liner assembly 22. Smaller diameter openings 32 reduce drag through the propulsion system 10. Larger openings produce greater drag and turbulence that disrupts airflow and therefore impacts overall propulsion system performance.

The example liner assembly 22 is fabricated according to a relationship that includes selected desired performance characteristics in view of physical dimensions of the face sheet 28. The method of fabricating the example liner assembly 22 includes the step of selecting a desired resistance. Resistance to air flow 40 is a performance characteristic that is utilized in determining the configuration of the liner assembly and is a performance measure that accounts for many physical factors of the liner assembly. Resistance is selected at a desired air flow speed, in this example 105 cm/sec, through the face sheet 28. This resistance is denoted as $R_{105}$. The resistance is a value that is indicative of a resistance to air flow as measured by a drop in pressure through the face sheet 28. The example liner assembly 22 is constructed to provide a resistance ($R_{105}$) within a range between 60 and 80 cgs Rayls.

The method of fabricating the example liner assembly 22 also includes the step of selecting a desired non-linearity factor. The non-linearity factor is selected to provide the desired acoustic performance over a range of air flows and sound levels that are indicative of operating conditions. It is desired to reduce the non-linearity factor to a value close to "1" as a value of "1" is indicative of a completely linearly performing liner.

The non-linearity factor provides a measure of any deviation from the linear idealized linear. The non-linearity factor is defined as the ratio between resistance at 200 cm/s airflow and the resistance at 20 cm/s airflow. In some instances some non-linearity is desired which is reflected in increased non-linearity values. As appreciated, the specific range of non-linearity factors utilized will reflect the desired liner performance for a specific application. The illustrated example liner assembly 22 is tailored to provide a desired non-linearity factor between 1.4 and 1.6.

The surface finish of the face sheet surface 38 also affects performance and is determined as a function of hole diameter and porosity. The face sheet surface 38 can be represented in an equivalent sand-grain roughness. The equivalent sand-grain roughness is determined as a factor related to the diameter and porosity of the openings 32 according to the relationship:

$$K_s = d \times 0.45\sigma \quad \text{(Equation 1)}$$

Where $K_s$ is the equivalent sand-grain roughness in centimeters;
d is the diameter of the opening in centimeters; and
σ is the porosity (% open area/100).

The example liner assembly 22 includes a surface finish of approximately 0.000367 cm (0.000144 inches) for holes having a nominal diameter of 0.00920 cm (0.00362 inches) and porosity of 8.85%. As appreciated, the measured surface finish is reflective of the size and porosity of openings provided in the face sheet 28.

The method utilizes the desired tailored performance values of the face sheet 28 to determine the specific range of hole diameters 34 and porosities. The method begins by specifying the desired performance of the liner assembly 22. Performance for the example liner assembly 22 is specified by selecting a range of resistance and non-linearity factors that are indicative of desired liner performance. Once the desired acoustic performance values are selected, the diameter and porosity of the face sheet 28 are determined according to a relationship accounting for each criterion.

The opening size or diameter refers to the smallest hydraulic diameter for an opening. As appreciated, the fabrication of openings in the perforated face sheet 28 produces a generally circular opening. However, that opening may include jagged edges and be somewhat out of round. Further, opening of different shapes will also provide the desired performance. Accordingly, the diameter that is determined is the hydraulic diameter of the opening. The hydraulic diameter applies to openings of many different shapes and also to an inconsistently shaped opening. Further, the opening extends through the thickness of the perforated face sheet and therefore may include a tapered shape. The hydraulic diameter determined is the smallest within the opening that occurs within the thickness.

In the illustrative example, the non-linearity factor ($R_{200}/R_{20}$) is a value between 1.4 and 1.6, and the resistance ($R_{105}$) is between 40 and 80 cgs Rayls. As appreciated, the non-linearity factor values and the resistance values are indicative of a selected liner performance, and the example liner assembly can be fabricated according to other desired performance requirements.

The non-linearity factor along with the resistance value is utilized to determine a required percent open area (POA) that will provide performance within the desired parameters. A relationship including the values selected that are indicative of the desired liner performance attributes are utilized to determine the physical dimensions for the liner assembly. The relationship utilizes known relationships to provide the desired dimensions. This is determined according to the empirical relationship:

$$POA = 4.202 \left( \frac{95 + 85NLF}{R_{105}(NLF - 1)} \right)^{0.474} \quad \text{(Equation 2)}$$

Where: POA is percent open area;
NLF is the selected non-linearity factor; and
$R_{105}$ is the selected resistance value in cgs Rayls.

Once the percent open area is determined, the diameter 34 of each of the plurality of openings 32 is determined. The diameter 34 is determined according to a relationship that factors in the selected non-linearity factor and the selected resistance values. The relationship is utilized to determine the diameter 34 of the opening 32 given a thickness 36 of the face sheet that is required to provide the desired performance. The example liner assembly 22 is fabricated to provide a performance having a NLF of between 1.4 and 1.6, and a $R_{105}$ resistance value within a range between 60 and 80 cgs Rayls.

The diameter of each of the openings 32 is determined according to the empirical relationship:

$$d = 9.42\left(\frac{19 + 17NLF}{R_{105}}\right)^{0.263} (NLF - 1)^{0.237} \sqrt{\frac{\mu t}{10 - NLF}}$$ (Equation 3)

Where d is the diameter of the opening in centimeters;
NLF is the non-linearity factor;
$R_{105}$ is the resistance value in cgs Rayls;
t=thickness of the face sheet in centimeters; and
$\mu$=the absolute viscosity ($1.789 \times 10^{-4}$ gm/cm-sec).

The diameter determined according to this relationship combined with the previously determined percent open area specifies a perforated face sheet 28 that provides the selected non-linearity and resistance values that are indicative of desired liner performance. The diameter 34 is determined utilizing the same parameters as is utilized to determine the percent open area. Accordingly, an example relationship can be utilized to determine the diameter 34 of the opening that is required in view of the thickness of the face sheet material.

The percent open area and diameter 34 are determined for each combination of range limits for the selected non-linearity values and resistance values. In the described example, non-linearity is selected to be between 1.4 and 1.6 and the $R_{105}$ resistance is selected to be between 60 and 80 cgs Rayls. Four combinations are determined utilizing these points to define a range of possible percent open area and hole diameter combinations that will fulfill the selected design requirements.

Figure 4:
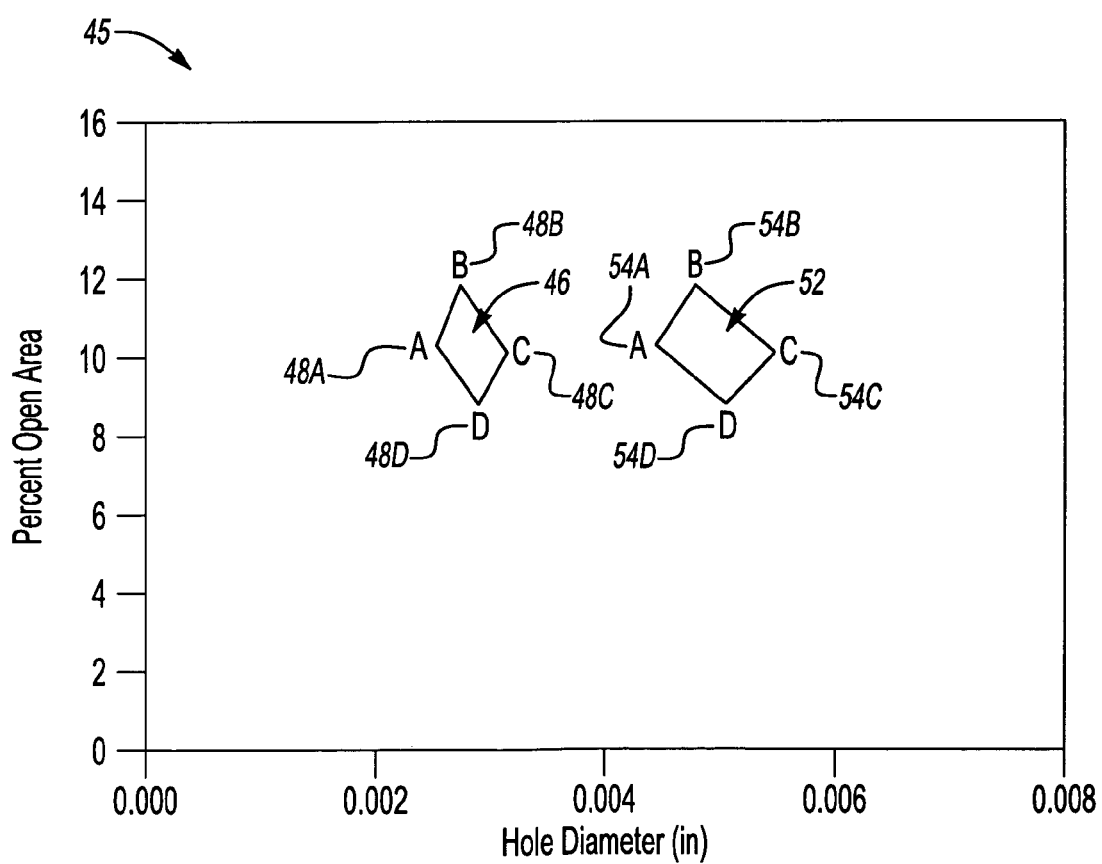
FIG. 4 is a graph of example design spaces created by the example method to provide desired acoustic liner performance.

Referring to FIG. 4, a graph 45 illustrates the example desired open areas utilized in conjunction with the required diameter 34 of the openings 32 for the specific thickness to determine a design space 46, within which the face sheet 28 will provide the desired performance. The design space 46 represents the range and combination of hole diameters and percent open areas for a face sheet 28 with a thickness of 0.051 cm (0.020 inches) that provides the desired performance relating to the selected NLF and $R_{105}$ resistance values.

In the example graph 45 the point 48A is determined by combining the percent open area and diameter that is determined utilizing a non-linearity factor of 1.4 and a resistance value of 80 cgs Rayls. The point 48A represents an open area of 10.35%, and a hole diameter 34 of 0.00661 cm (0.00260 inches). Another point 48B is determined utilizing the non-linearity value of 1.4, and a resistance value of 60 cgs Rayls. The point 48B represents an open area 11.86% and a diameter 34 of 0.00713 cm (0.00281 inches). Point 48C is determined utilizing the non-linearity value of 1.6 and a resistance value of 60 cgs Rayls, and represents an open area of 10.14% and a diameter 34 of 0.00811 cm (0.00319 inches). Point 48D is determined utilizing the non-linearity value of 1.6 and the resistance value of 80 cgs Rayls and represents a percent open area of 8.85% and a hole diameter of 0.00752 cm (0.00296 inches). The resulting design space 46 applies to a face sheet having thickness of 0.0508 cm (0.020 inches) in order to provide the desired performance. As appreciated, for different selected NLF and $R_{105}$ resistance values, different design spaces will by defined that will in turn provide the selected liner performance.

Another design space 52 illustrates the combination of percent open area and hole diameter required for a face sheet having a thickness of 0.152 cm (0.06 inches) in order to provide the desired liner performance for the example NLF and $R_{105}$ resistance values. The percent open areas are substantially the same as for the thinner face sheet material utilized for the example design space 46 with an increased range and size of hole diameters. The increased hole diameters and percent open area combinations indicated by points 54A, 54B, 54C and 54D provide the desired liner performance in the thicker face sheet. The larger diameter openings operate to provide substantially equal performance as compared to the face sheet with a thickness of 0.051 cm (0.020 inches). The example point 54A relates to a hole diameter 34 of 0.0115 cm (0.00451 inches), point 54B relates to a hole diameter 34 of 0.0124 cm (0.00486 inches), point 54C relates to a hole diameter 34 of 0.0140 cm (0.00553 inches) and point 54D relates to a hole diameter 34 of 0.0130 cm (0.00513 inches).

Although the hole diameter required to provide the selected liner performance can vary for differing thickness of face sheet 38, a specific range of hole sizes as related to face sheet thickness applies to the example liner assembly. The hole diameter is no more than $¼^{th}$ the thickness of the face sheet to provide the desired performance. Although hole diameters are greater in the thicker face sheet provided for in the design space 52, any hole diameter is no more than $¼^{th}$ the thickness. The hole diameter 34 may be less, such as for example $⅛^{th}$ the thickness of the face sheet or even less, but is not greater than $¼^{th}$ the face sheet thickness.

The method of fabricating a liner assembly according to this invention begins by first selecting a $R_{105}$ resistance and non-linearity factor. The resistance is tailored to the application operating conditions to provide for the attenuation of noise within a desired noise frequency band. The disclosed example includes a range of resistance of between 60 and 80 cgs Rayls for an air flow speed of 105 cm/sec. The NLF is selected to provide the desired acoustic performance over a range of engine operating conditions. The example NLF range is between 1.4 and 1.6 to provide the desired liner performance.

Once the acoustic performance parameters have been selected, the percent open area is determined utilizing the example relationship represented by equation 2. Once the percent open area is determined the diameter for the opening is determined as it relates to the thickness of the desired face sheet material. The diameter is determined for each combination provided by the extreme limits of range for NLF and $R_{105}$ resistance. The pairs of related diameters and percent open areas define the boundaries of the design space. Any pair of percent open area and hole diameter within the defined design space will provide the selected NLF and $R_{105}$ resistance for the liner assembly 22.

Accordingly, the example method of fabricating a liner assembly provides a liner assembly having a selected NLF and resistance value that provides the desired noise attenuation while providing a perforated face sheet that increases durability compared to a woven mesh liner. Further, the example ratio of each of the plurality of hole diameters being less then approximately $¼^{th}$ the thickness of the face sheet provides a relatively smooth surface with substantially the same drag as is created for a non-perforated face sheet. Acoustic liner assemblies fabricated with a face sheet designed and built according to the method of this invention provide improved acoustic performance, reduced drag affects and improved linearity across a wide range of engine operating conditions in a durable acoustic liner assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of fabricating a noise attenuating liner comprising the steps of:
   a) supporting a cellular structure on a support backing;
   b) covering the cellular structure with a perforated face sheet, where the perforated face sheet includes a plurality of openings for communicating acoustic energy to the cellular structure;
   d) determining a range of percent open areas of the perforated face sheet based on selected upper and lower limits of a non-linearity factor and a resistance value;
   e) determining an opening size for each of the plurality of openings based on the selected upper and tower limits of the non-linearity factor and the resistance value that is no greater than $\frac{1}{4}^{th}$ a thickness of the perforated face sheet;
   f) generating a design range of percent open areas and hole diameters based on the determined range of percent open area and opening size; and
   g) forming the plurality of openings within the perforated sheet that includes openings with an opening size and percent open area within the generated design range.

2. The method as recited in claim 1, wherein the method includes sizing each of the plurality of openings to provide a desired acoustic resistance.

3. The method as recited in claim 1, wherein the method includes sizing each of the plurality of openings to provide a desired non-linearity factor.

4. The method as recited in claim 1, wherein the method includes determining a size of each of the plurality of openings according to a relationship including a selected non-linearity factor, a selected resistance value and the thickness of the perforated sheet.

5. The method as recited in claim 1, wherein an open area of the perforated face sheet is greater than 5%.

6. The method as recited in claim 1, wherein the size of the opening comprises a hydraulic diameter within the opening through the perforated face sheet.

7. The method as recited in claim 1, wherein the percent open area is determined according to the relationship:

$$POA = 4.202 \left( \frac{95 + 85NLF}{R_{105}(NLF-1)} \right)^{0.474}$$

Where: POA is percent open area;
NLF is the selected non-linearity factor; and
$R_{105}$ is the selected resistance value in cgs Rayls.

8. The method as recited in claim 1, wherein the hole diameter is determined according to the relationship:

$$d = 9.42 \left( \frac{19 + 17NLF}{R_{105}} \right)^{0.263} (NLF-1)^{0.237} \sqrt{\frac{\mu t}{10 - NLF}}$$

Where d is the diameter of the opening in centimeters;
NLF is the non-linearity factor;
$R_{105}$ is the resistance value in cgs Rayls;
t=thickness of the face sheet in centimeters; and $\mu$=the absolute viscosity ($1.789 \times 10^{-4}$ gm/cm-sec).

9. The method as recited in claim 1, wherein the step of generating a design range includes defining outer boundaries for the percent open area and hole diameters based on the upper and lower limits of the non-linearity factor and resistance value.

10. A method of fabricating a perforated face sheet for a noise attenuation liner comprising the steps of:
    (a) specifying a desired thickness of the perforated face sheet;
    (b) determining a desired percent open area for the perforated face sheet based on a non-linearity factor and a value indicative of resistance to airflow;
    (c) determining an opening size based on the non-linearity factor and the value indicative of resistance to airflow;
    (d) forming a plurality of holes in the perforated face sheet including the determined opening size and percent open area, wherein a diameter of each of the plurality of openings is not greater than $\frac{1}{4}^{th}$ a thickness of the perforated face sheet.

11. The method as recited in claim 10, wherein the diameter of each of the plurality of openings comprises a hydraulic diameter within each opening through the perforated face sheet.

12. The method as recited in claim 10, wherein the diameter of each of the plurality of holes is no greater than 0.0254 cm (0.0100 inches).

13. The method as recited in claim 10, wherein the thickness of the perforated sheet is at least 0.051 cm (0.020 inches).

14. A noise attenuation liner assembly comprising
    a cellular structure disposed on a support backing;
    a perforated metal sheet including a plurality of openings affixed over the cellular structure on a side opposite the support backing, wherein an opening size for each of the plurality of openings and percent open area of the perforated metal sheet is determined based on a desired non-linearity factor and a factor indicative of resistance to flow.

15. The assembly as recited in claim 14, wherein an upper and lower limit of both the non-linearity factor and the factor resistance to flow are utilized to define a range of desired percent open areas and opening size that provide a desired acoustic performance, and the plurality of openings are formed based on the defined range.

16. The assembly as recited in claim 14, wherein the opening size defined based on the non-linearity factor and the factor resistant to flow is less then $\frac{1}{4}^{th}$ the thickness of the perforated metal sheet.

17. The assembly as recited in claim 16, wherein the opening size comprises a hydraulic diameter.

* * * * *

UNITED STATES PATENT AND TRADEMARK OFFICE
CERTIFICATE OF CORRECTION

PATENT NO. : 7,540,354 B2 Page 1 of 1
APPLICATION NO. : 11/441912
DATED : June 2, 2009
INVENTOR(S) : Morin et al.

It is certified that error appears in the above-identified patent and that said Letters Patent is hereby corrected as shown below:

IN THE CLAIMS:

Claim 1, Column 7, Line 16: Change "tower" to "lower"

Signed and Sealed this

Twenty-fifth Day of August, 2009

David J. Kappos
*Director of the United States Patent and Trademark Office*